United States Patent [19]

Honda et al.

[11] 4,246,382

[45] Jan. 20, 1981

[54] SOLVENT RESISTENT ACRYLIC RESIN AND PROCESS FOR PRODUCING THE SAME

[75] Inventors: Makoto Honda, Tokyo; Koke Ozawa, Fujisawa; Kazuhiro Hosoya, Tokyo; Jiro Kurita, Yokohama, all of Japan

[73] Assignee: Asahi Kasei Kogyo Kabushiki Kaisha, Osaka, Japan

[21] Appl. No.: 957,887

[22] Filed: Nov. 6, 1978

[30] Foreign Application Priority Data

Nov. 11, 1977 [JP] Japan .................................. 52-134728
Feb. 22, 1978 [JP] Japan .................................. 53-19514
May 17, 1978 [JP] Japan .................................. 53-58476
Jul. 6, 1978 [JP] Japan .................................. 53-81438

[51] Int. Cl.$^3$ ....................... C08F 2/38; C08F 20/14
[52] U.S. Cl. ....................................... 526/79; 526/78; 526/82; 526/222; 526/224; 526/328.5; 526/329.7
[58] Field of Search ..................... 526/78, 79, 82, 224, 526/328.5, 329.7, 222

[56] References Cited

U.S. PATENT DOCUMENTS

| | | | |
|---|---|---|---|
| 3,198,775 | 8/1965 | DeLacretaz et al. | 526/79 |
| 3,272,786 | 9/1966 | Perry | 526/329.7 |
| 3,960,824 | 6/1976 | Hicks | 526/224 |
| 4,145,494 | 3/1979 | Neubert | 526/224 |

*Primary Examiner*—Harry Wong, Jr.

[57] ABSTRACT

An acrylic resin having resistance to crazing or crack formation when brought into contact with an organic solvent may be prepared by polymerizing or copolymerizing a monomer or monomers comprising (1) 50 to 100 wt. % of methyl methacrylate and (2) 0 to 50 wt. % of at least one monomer selected from the group consisting of an acrylic ester and a methacrylic acid ester, and adding a chain transfer agent after initiation and prior to completion of the polymerization. The acrylic resins have an intrinsic viscosity of 0.028 to 0.117 liters per gram, and a ratio of weight-average molecular weight to number-average molecular weight of 2.3 to 6.0.

9 Claims, No Drawings

SOLVENT RESISTANT ACRYLIC RESIN AND PROCESS FOR PRODUCING THE SAME

FIELD OF INVENTION

The present invention relates to an acrylic resin having an excellent solvent resistance, and methods of making such resins. The resins are obtained by adjusting the molecular weight and the distribution of molecular weight within a specific range through addition of a chain transfer agent during polymerization.

BACKGROUND OF INVENTION

Acrylic resins are widely used in various fields as molding materials due to their excellent transparency, luster, surface hardness, weatherability, mechanical strength, heat distortion resistance, etc.

Conventional acrylic resins, however, are often subject to the defect of crazing or crack formation when they are brought into contact with an organic solvent, such as ethanol, thinner for paints, etc. Examples of instances when organic solvents may come into contact with acrylic resins with resultant crazing or crack formation include when an antistatic agent is coated on an acrylic resin molding using ethanol as a diluent, or when the resins are subjected to printing or coating using an organic solvent as a thinner, or when acrylic resin plates are bend-fabricated and adhered to each other using methylene chloride or the like. Since crazing or crack formation spoils the excellent appearance of acrylic resins, and since their excellent appearance is one of their substantial merits, crazing or crack generation in acrylic resins is a substantial problem.

The resistance of acrylic resins to occurrence of crazing or crack formation when they are brought into contact with an organic solvent (referred to herein as "solvent resistance") depends upon the kinds and proportions of copolymerized monomers, average molecular weight, and the kinds and amounts of various additives, such as lubricants or plasticizers, added to the resins for various purposes. In general, the solvent resistance increases as the molecular weight of the resin increases. However, if the molecular weight becomes too high, melt viscosity becomes so high that workability decreases, making molding difficult. Hence molecular weight can not be increased without restriction.

In order to reduce the melt viscosity for molding workability, methyl methacrylate (hereinafter abbreviated as MMA) has been copolymerized with acrylic ester (hereinafter abbreviated as AE) and/or a methacrylic ester (hereinafter abbreviated as MAE) consisting of the reaction product of an alkyl alcohol having two or more carbon atoms and methacrylic acid. It is also known to reduce melt viscosity by adding a lubricant or a plasticizer, such as stearyl alcohol, cetyl alcohol, dibutyl phthalate, 2-ethylhexyl phthalate, etc. However, these methods decrease the heat distortion temperature (HDT), and hence there are inherent limits on the copolymerization ratio and the amounts of the additives that may be employed. Acrylic resins should have a heat distortion temperature of not lower than 70° C. measured in accordance with ASTM D 648, or practical problems are presented in some cases.

As discussed above, molecular weight of the resin, copolymerization ratio, and the kinds and the amounts of additives that may be employed are restricted because of practical requirements for molding workability and heat distortion temperature, etc. Thus, there have been known no molding materials simultaneously satisfying molding workability, practically satisfactory physical properties and solvent resistance. The above-described difficulties are overcome with the present invention.

SUMMARY OF THE INVENTION

In accordance with the present invention it has been discovered that the solvent resistance of acrylic resins can be improved remarkably by adjusting the molecular weight and the distribution of molecular weight of the resins within a specific range through addition of a chain transfer agent in the course of the polymerization reaction.

The present invention provides a remarkably solvent resistant acrylic resin having an intrinsic viscosity $[\eta]$, of 0.028 to 0.117 liters per gram ( 1 g), and a ratio of weight-average molecular weight (Mw) to number-average molecular weight (Mn) (i.e., Mw/Mn) of 2.3 to 6.0, measured by gel permeation chromatography (GPC). The process for producing the acrylic resins of the present invention comprises polymerizing or copolymerizing a monomer or monomers comprising (1) 50 to 100 by weight (wt. %) of methyl methacrylate (MMA) and (2) 0 to 50 wt. % of at least one monomer selected from the group consisting of an acrylic ester (AE) and a methacrylic acid ester, and adding about 0.01% to about 5 wt. %, based on the weight of monomer, of a chain transfer agent after initiation and prior to completion of the polymerization.

The polymerization reaction may be conducted using a polymerization initiator. Furthermore, up to 1 wt. % of a chain transfer agent, based on the weight of the monomer or monomers, may coexist with the monomer prior to initiation of polymerization, with additional chain transfer agent being added after initiation of polymerization. If a chain transfer agent is present prior to initiation of polymerization, it may be the same as, or different from, the chain transfer agent added after initiation of polymerization.

DESCRIPTION OF PREFERRED EMBODIMENTS

The acrylic resin of the present invention is an MMA homopolymer or a copolymer containing not less than 50 wt. %, and preferably not less than 80 wt. %, of an MMA component. Suitable copolymer components are AE and/or MAE.

As the copolymerizable AE, esters comprising the reaction product of an alkyl alcohol having 1 to 8 carbon atoms and acrylic acid can be used. Specific examples thereof include methyl acrylate, ethyl acrylate, n-butyl acrylate and 2-ethylhexyl acrylate. As MAE, there can be used esters comprising the reaction product of an alkyl alcohol having 2 to 12 carbon atoms and methacrylic acid. Specific examples thereof include ethyl mechacrylate, n-butyl methacrylate, 2-ethylhexyl methacrylate, and lauryl methacrylate.

To the acrylic resin, if necessary, can be added conventional additives, such as plasticizers, lubricants, mold release agents, stabilizers, colorants, etc. in conventional amounts not exceeding 20 wt. % of the acrylic resin.

In the present invention, it is necessary to adjust the intrinsic viscosity, $[\eta]$, of the resulting acrylic resin within the range of 0.028 to 0.117 l/g. If the intrinsic viscosity is less than about 0.028 l/g mechanical strength decreases to a degree that is practically unsatisfactory. If the intrinsic viscosity is more than about 0.117 l/g, the melt viscosity becomes so high that molding work becomes difficult or impossible.

As used herein, intrinsic viscosity, [η], is determined at 20° C. using chloroform as a solvent, and is in the relation represented by the following equation with the viscosity-average molecular weight, M:

$$[\eta] = 4.85 \times 10^{-6} M^{0.8} (l/g)$$

An intrinsic viscosity of 0.028 to 0.117 l/g corresponds to a viscosity-average molecular weight of 50,000 to 300,000.

In accordance with the present invention, the ratio of weight-average molecular weight, Mw, to number-average molecular weight, Mn (Mw/Mn) measured according to GPC must be within the range of 2.3 to 6.0 to obtain the desired improvement in the solvent resistance of the acrylic resin. If this ratio (Mw/Mn) exceeds about 6.0, mechanical strength of the resin will be reduced to such a low degree that the acrylic resin obtained is not of practical use. On the other hand, if it is less than about 2.3, the solvent resistance will not be improved and the resultant acrylic resin will have the same solvent resistance problem as conventional ones. A particularly preferred Mw/Mn ratio is within the range of 2.5 to 6.0.

Measurement of the molecular weight distribution through GPC is generally effected in a manner such as is described in, e.g., Takeda et al; "Gel Chromatography (Fundamental Part)", published by Kodansha, pp. 97-122. For example, molecular weight distribution of the acrylic resin can be determined as follows.

Two columns of HSG-20 and -50 (made by Shimazu Seisakusho Ltd.) are used as columns, and a calibration chart is made using standard polystyrene produced by Pressure Chemical Co. An elution curve of a 0.5 wt. % tetrahydrofuran solution of acrylic resin obtained by GPC is equally divided, and the height at each division point is measured. Using tetrahydrofuran as a carrier solvent, and measurements effected at 30° C. at a flow rate of 1-1.5 ml/min, the weight-average molecular weight and the number-average molecular weight are determined according to the following equations:

$$Mw = \frac{Q_M \sum_i \{HiMi(P)\}}{Q_P \sum_i Hi} \quad (1)$$

$$Mn = \frac{Q_M \sum_i Hi}{Q_P \sum_i \left( \frac{Hi}{Mi(P)} \right)} \quad (2)$$

wherein Hi represents a height of elution curve at division point i, Mi(P) represents a molecular weight of the standard polystyrene at division point i, and $Q_M$ and $Q_P$ represent Q factors of acrylic resin and polystyrene and are 39 and 41, respectively.

In order to produce acrylic resin having an intrinsic viscosity, [η], of 0.028 to 0.117 l/g and a ratio of weight-average molecular weight, [Mw], to number-average molecular weight, [Mn], of 2.3 to 6.0, it is necessary, in accordance with the process of the present invention, to add a chain transfer agent to the reaction system after initiation of the polymerization and before substantial completion of the polymerization. If polymerization is effected in a conventional manner by adding a polymerization initiator and a chain transfer agent to the monomer or monomers, a polymer will be obtained which has a ratio of weight-average molecular weight to number-average molecular weight, Mw/Mn, of only 1.9 to 2.2.

In the process of the present invention, suspension polymerization, bulk polymerization or solution polymerization may be employed and the chain transfer agent may be added batchwise in one or more portions, continuously, or intermittently. In addition, the chain transfer agent may be added independently or after dissolving in a portion of the monomers to be polymerized or, in the case of solution polymerization, it may be dissolved in a solvent.

In the process of the present invention, preferably polymerization is allowed to advance until the degree of conversion to polymer reaches 99% or more in suspension polymerization or batchwise bulk polymerization processes. In the case of continuous bulk polymerization, batchwise solution polymerization preferably is controlled until the degree of conversion to polymer is about 60 to 99%, followed by heating to 200° to 300° C. Subsequently, if necessary, further heating may be conducted under reduced pressure to remove unreacted monomers or the solvent used.

In the process of the present invention, preferably the polymerization reaction is conducted at a temperature of 40° to 170° C. using a polymerization initiator. Any known polymerization initiator can be used in the process of the present invention; for example, radical initiators, such as organic peroxides like diacyl peroxides (e.g., benzoyl peroxide, etc.); peresters (e.g., t-butyl perbenzoate, etc.); and azo compounds (e.g., azobisisobutyronitrile, etc.).

Known chain transfer agents can be used in the process of the present invention. Preferred examples include alkylmercaptans containing 4 to 18 carbon atoms; esters of thioglycolic acid and an alkyl alcohol having 1 to 12 carbon atoms; and aromatic mercaptans such as thiophenol, thiocresol, thionaphthol, benzylmercaptan, etc.

Adjustment of the molecular weight and Mw/Mn is achieved by controlling the stage at which the chain transfer agent is added in the course of the reaction and the amount of chain transfer agent added. Although it is not required, the chain transfer agent may coexist in the monomer, prior to or at initiation of polymerization, in an amount of 1 wt. % at the most. If the chain transfer agent exists in the monomer prior to initiation of polymerization in an amount of more than 1 wt. %, it becomes difficult to maintain the [η] and Mw/Mn of the resulting resin within the ranges of 0.028 to 0.117 l/g and 2.3 to 6.0, respectively. The chain transfer agent is preferably allowed to exist in the monomer in an amount of 0.01 to 0.6 wt. % before initiation of the polymerization.

The amount of chain transfer agent to be added in the course of polymerization reaction is 0.01 to 5 wt. %. If the amount is less than 0.01 wt. %, it will be difficult to adjust the [η] and Mw/Mn of the resulting resin within the ranges of 0.028 to 0.117 l/g and 2.3 to 6.0, respectively, whereas if more than 5 wt. % is used, the mechanical strength of the acrylic resin will be reduced.

Inclusion of the chain transfer agent is effected by batchwise addition in one or more portions, or by adding continuously or merely intermittently. If a chain transfer agent exists in the monomer prior to polymerization, the chain transfer agent added after initiation of polymerization may be the same as or different from the chain transfer agent already existing in the monomer solution. In the case of suspension polymerization, the chain transfer agent is preferably added at a stage where the degree of conversion to polymer reaches 15 to 60%. In the case of bulk polymerization or solution polymerization, the chain transfer agent is preferably added at a stage where the degree of conversion to polymer reaches 10 to 50%.

The degree of conversion to polymer in the course of the reaction can be measured as follows. First, a sample is dissolved in acetone containing a polymerization inhibitor such as hydroquinone, hydroquinone monomethyl ether, etc., and the amount of unreacted monomer is determined through gas chromatography. Then, methanol is added to the acetone solution to precipitate polymer. The precipitated polymer is filtered out, dried under reduced pressure, and weighed. The degree of conversion to polymer is calculated from the weight ratio of unreacted monomer to polymer.

The process of the present invention provides an easy method of obtaining acrylic resins having an excellent solvent resistance, is extremely useful from the industrial point of view.

perature was 230° C., injection pressure was 600 kg/cm$^2$, and mold temperature was at three levels (30° C., 40° C. and 50° C.). The thus obtained moldings were left for 24 hours at 20° C and at a humidity of 60% for moisture conditioning, then dipped for 1 minute in a 25° C. ethanol or xylene solution to observe the state of cracks formed. Intrinsic viscosities and molecular weight distributions (Mw/Mn) determined through GPC (LC-1 made by Shimazu Seisakusho, Ltd.) are shown in Table 1.

In addition, the thus obtained resins were molded into sample pieces (6 mm×12.5 mm×125 mm) under the conditions of 230° C. in cylinder temperature, 700 kg/cm$^2$ in injection pressure and 50° C. in mold temperature using an injection molding machine (Meomat 47/28, made by Sumitomo Ship Building and Machinery Co., Ltd.). After conditioning for 24 hours at a temperature of 20° C. and at a humidity of 60%, the heat distortion temperature was determined in accordance with the procedure of ASTM D 648. The results are shown in Table 1.

TABLE 1

| Ex. No. | Composition (wt. %) MMA | MA[1] | $[\eta]^2$ | Mw/Mn[3] | °C.[4] | Cracking[5] Mold temp.[6] Xylene | Ethanol | Mold temp.[7] Xylene | Ethanol | Mold temp.[8] Xylene | Ethanol |
|---|---|---|---|---|---|---|---|---|---|---|---|
| 1 | 94 | 6 | 0.050 | 2.5 | 86 | Many cracks | Many cracks | Slight cracks | Slight cracks | None | None |
| 2 | 89 | 11 | 0.050 | 2.5 | 81 | Slight cracks | Slight cracks | Extremely slight cracks | Extremely slight cracks | None | None |
| 3 | 88 | 12 | 0.050 | 2.5 | 80 | None | None | None | None | None | None |
| 4 | 87 | 13 | 0.050 | 2.5 | 79 | None | None | None | None | None | None |
| 5 | 85 | 15 | 0.050 | 2.5 | 74 | None | None | None | None | None | None |
| 6 | 84 | 16 | 0.050 | 2.5 | 73 | None | None | None | None | None | None |
| 7 | 82 | 18 | 0.050 | 2.5 | 70 | None | None | None | None | None | None |
| 8 | 80 | 20 | 0.050 | 2.5 | 68 | None | None | None | None | None | None |

[1]Methyl acrylate
[2]Intrinsic viscosity (l/g)
[3]Weight-average molecular weight to number-average molecular weight ratio
[4]Heat distortion temperature
[5]Formation of cracks upon dipping in a solvent
[6]Mold temperature: 30° C.
[7]Mold temperature: 40° C.
[8]Mold temperature: 50° C.

EXAMPLES 1-8

4,000 g of a monomer solution comprising 100 parts by weight of a monomer mixture comprising methyl methacrylate and methyl acrylate in composition ratio shown in Table 1, 0.3 part by weight of lauroyl peroxide and 0.24 part by weight of n-dodecylmercaptan was suspended in 6,000 g of a suspension phase comprising 250 parts by weight of water and 1 part by weight of potassium polymethacrylate. Polymerization was initiated at a polymerization temperature of 80° C. and, 70 minutes after initiation of the polymerization, 0.25 part by weight of n-dodecylmercaptan was added thereto. The reaction was allowed to further advance to completion, with bead-like resin being obtained. The thus obtained resin was washed, filtered out and dried.

The resulting resin was molded using an injection molding machine (Neomat 47/28, made by Sumitomo Ship Building and Machinery Co., Ltd.) to obtain transparent, plane plate-like injection moldings (3 mm×20 mm×130 mm). As molding conditions, cylinder tem-

EXAMPLES 9-14

4,000 g of a monomer solution comprising 100 parts by weight of a monomer mixture of 86% methyl methacrylate and 14% methyl acrylate, 0.1 part by weight of azobisisobutyronitrile and n-dodecylmercaptan in an amount shown in Table 2 was suspended in 6,000 g of a suspension phase comprising 150 parts by weight of water and 0.6 part by weight of potassium polymethacrylate. Polymerization was initiated at a polymerization temperature of 75° C. and n-dodecylmercaptan was added thereto in the amounts shown in Table 2 after the times shown in Table 2. The reaction was allowed to further advance to the completion to obtain beadlike resin, which was washed and dried.

Intrinsic viscosities and Mw/Mn of the resins and the state of crack formation upon dipping the moldings of the resins into a solvent were examined and the results of these examinations are shown in Table 2. Additionally, heat distortion temperature was 76° C. with all samples.

As a comparative example, a sample with a low Mw/Mn, prepared without additional addition of n-dodecylmercaptan is also given in Table 2.

TABLE 2

| Ex. No. | n-Dodecylmercaptan Added Amount (parts) In.[2] | Add.[3] | Min.[1] | $[\eta]$[4] | Mw/Mn[5] | Cracking[6] Mold temp.[7] Xylene | Ethanol | Mold temp.[8] Xylene | Ethanol | Mold temp.[9] Xylene | Ethanol |
|---|---|---|---|---|---|---|---|---|---|---|---|
| 9 | 0.14 | 0.27 | 40 | 0.060 | 2.3 | Extremely slight cracks | Extremely slight cracks | Extremely slight cracks | Extremely slight cracks | None | None |
| 10 | 0.19 | 0.20 | 70 | 0.060 | 2.5 | None | None | None | None | None | None |
| 11 | 0.15 | 0.50 | 40 | 0.050 | 2.8 | None | None | None | None | None | None |
| 12 | 0.20 | 0.50 | 70 | 0.055 | 3.5 | None | None | None | None | None | None |
| 13 | 0.10 | 0.60 | 70 | 0.070 | 4.1 | None | None | None | None | None | None |
| 14 | 0.11 | 0.90 | 70 | 0.080 | 5.0 | None | None | None | None | None | None |
| * | 0.35 | — | — | 0.050 | 2.0 | Many cracks | Many cracks | Many cracks | Many cracks | Many cracks | Many cracks |
| * | 0.24 | — | — | 0.070 | 2.0 | Many cracks | Many cracks | Many cracks | Many cracks | Many cracks | Many cracks |

[1]Stage of additional addition (minutes)
[2]Initial amount
[3]Additional amount
[4]Intrinsic viscosity (l/g)
[5]Weight-average molecular weight to number-average molecular weight ratio
[6]Formation of cracks upon dipping in a solvent
[7]Mold temperature: 30° C.
[8]Mold temperature: 40° C.
[9]Mold temperature: 50° C. *Comparative Examples

EXAMPLES 15-20

Resins were obtained by polymerizing, in the same manner as in Examples 1-8, a monomer mixture of methyl methacrylate and methyl acrylate, ethyl acrylate or butyl acrylate as shown in Table 3. Intrinsic viscosities, Mw/Mn and heat distortion temperature (HDT) of the resulting resins and cracks of the moldings thereof upon dipping in a solvent were examined. With every sample, intrinsic viscosity and Mw/Mn were 0.050 l/g and 2.5, respectively. Heat distortion tempertures and the state of crack formation are shown in Table 3.

TABLE 3

| Ex. No. | Composition (wt. %) MMA | Methyl acrylate | Ethyl acrylate | Butyl acrylate | HDT[1] (°C.) | Formation of cracks upon dipping in a solvent Mold temp.[2] Xylene | Ethanol | Mold temp.[3] Xylene | Ethanol | Mold temp.[4] Xylene | Ethanol |
|---|---|---|---|---|---|---|---|---|---|---|---|
| 14 | 88 | — | 12 | — | 77 | None | None | None | None | None | None |
| 15 | 85 | — | 15 | — | 72 | None | None | None | None | None | None |
| 16 | 91 | — | — | 9 | 78 | None | None | None | None | None | None |
| 17 | 87 | — | — | 13 | 70 | None | None | None | None | None | None |
| 18 | 90 | 5 | — | 5 | 80 | None | None | None | None | None | None |
| 19 | 97 | 10 | — | 3 | 73 | None | None | None | None | None | None |

[1]Heat distortion temperature
[2]Mold temperature: 30° C.
[3]Mold temperature: 40° C.
[4]Mold temperature: 50° C.

EXAMPLES 21-24

A monomer solution comprising 86 parts of MMA, 14 parts of methyl acrylate (MA), 0.05 part of lauroyl peroxide and n-dodecylmercaptan in an amount shown in Table 4 was introduced into a batchwise reactor equipped with a stirrer and a heating jacket. The resultant solution was rapidly heated to 130° C. and maintained at this temperature for 120 minutes by passing a heating medium through the jacket. A refrigerant was then passed through the jacket to cool the solution to room temperature. Analysis of part of the solution revealed that it was a syrup with the degree of conversion to polymer shown in Table 4. To this syrup was added 0.20 part of lauroyl peroxide and n-dodecylmercaptan in an amount shown in Table 4. After thorough stirring, the mixture was placed in a 30 cm × 20 cm × 3 cm polyethylene vessel. After heating for 10 hours at 60° C., heating was further continued for two hours at 100° C. to complete the polymerization. The thus polymerized polymer was taken out of the vessel, crushed by means of a mill, then pelletized using an extruder. Solvent resistance and heat distortion temperature of the resulting pellets were measured in the same manner as in Examples 1-8. The results are shown in Table 4. Intrinsic viscosities, $[\eta]$, of these polymers and Mw/Mn thereof measured through GPC are also shown in Table 4.

For the purpose of comparison, solvent resistance and heat distortion temperature (HDT) of the molding obtained by polymerizing and molding in the same manner as in these examples except that no chain transfer agent addition was made to the syrup are also shown in Table 4.

TABLE 4

| Ex. No. | n-Dodecylmercaptan In.[1] | Add.[2] | Conv.[3] | $[\eta]$[4] | Mw/Mn[5] | HDT[6] | Xylene[7] 30° C.[9] | 40° C.[9] | 50° C.[9] | Ethanol[8] 30° C.[9] | 40° C.[9] | 50° C.[9] |
|---|---|---|---|---|---|---|---|---|---|---|---|---|
| 21 | 0.24 | 0.20 | 27 | 0.058 | 2.3 | 76 | Extremely slight cracks | Extremely slight cracks | None | Extremely slight cracks | Extremely slight cracks | None |
| 22 | 0.20 | 0.38 | 28 | 0.058 | 2.6 | 76 | None | None | None | None | None | None |

TABLE 4-continued

| Ex. No. | n-Dodecylmercaptan | | | [η][4] | Mw/Mn[5] | HDT[6] | Xylene[7] | | | Ethanol[8] | | |
|---|---|---|---|---|---|---|---|---|---|---|---|---|
| | In.[1] | Add.[2] | Conv.[3] | | | | 30° C.[9] | 40° C.[9] | 50° C.[9] | 30° C.[9] | 40° C.[9] | 50° C.[9] |
| 23 | 0.16 | 0.62 | 30 | 0.058 | 3.6 | 76 | None | None | None | None | None | None |
| 24 | 0.09 | 0.92 | 31 | 0.060 | 5.1 | 76 | None | None | None | None | None | None |
| ** | 0.30 | — | | 0.060 | 2.1 | 76 | Many cracks | Many cracks | Many cracks | Many cracks | Many cracks | Many cracks |

[1]Amount of n-dodecylmercaptan in the monomer solution at initiating polymerization (parts by wt.)
[2]Amount of n-dodecylmercaptan added after initiating polymerization (parts by wt.)
[3]Degree of conversion at the stage where additional n-dodecylmercaptan was added
[4]Intrinsic viscosity (l/g)
[5]Weight-average molecular weight to number-average molecular weight ratio
[6]Heat distortion temperature (°C.)
[7]Crack formation upon dipping in xylene
[8]Crack formation upon dipping in ethanol
[9]Temperature of metal mold
**Comparative example

EXAMPLE 25

A solution comprising 70 parts of MMA, 30 parts of toluene, 0.3 part of lauroyl peroxide and 0.20 part of n-dodecylmercaptan was fed, using a pump, into 1.5 first reactor equipped with a stirrer and a heating jacket at a rate of 0.65 l/hr. The temperature of the first reactor was controlled at about 73° C. by means of the jacket. The first reactor was connected to a second reactor of the same shape and the same volume, and a polymerized polymer was continuously taken out of the second reactor. The temperature of the second reactor was controlled at 80° C. n-Dodecylmercaptan was fed to the second reactor, using a pump, at a rate of 3.0 cc/hr. Analysis of the contents of the first and second reactors revealed that the degree of conversion to polymer in the first reactor was 35%, and that in the second reactor was 80%.

The polymer taken out of the second reactor was a soft solid, which was treated in a vacuum drier equipped with a heating jacket to remove toluene and unreacted MMA. A block-like polymer was obtained. Treating conditions were 240° C. in temperature, 1 mmHg in vacuum, and 30 minutes in treating time.

The block-like polymer was crushed by means of a mill, and pelletized using an extruder having a vent. Intrinsic viscosity, [η], molecular weight distribution, Mw/Mn, and HDT were 0.053 l/g, 2.7, and 94° C., respectively. When solvent resistance of the pellets was tested in the same manner as in Examples 1–8, only slight cracks were formed under all the mold temperature conditions of 30° C., 40° C., and 50° C.

EXAMPLE 26

A solution comprising 67 parts of MMA, 3 parts of MA, 30 parts of toluene, 0.1 part of azobisisobutyronitrile and 0.1 part of 2-ethylhexyl thioglycolate was fed at a rate of 3 liter/hr. using a pump into a first reactor of the same shape and the same volume as used in Example 25. The first reactor was connected to a second reactor of the same shape and the same volume, and the second reactor was connected to a third reactor of the same shape and the same volume. The first, second, and third reactors were all controlled to 90° C. in temperature.

n-Octylmercaptan was fed into the second and third reactors at rates of 2.1 cc/hr and 1.2 cc/hr, respectively. Soft solid polymer was taken out of the third reactor. As shown by analysis, the degrees of conversion to the polymer in the first, second, and third reactors were 35%, 50%, and 60%, respectively.

The polymer obtained was heat- and vacuum-treated, crushed and pelletized in the same manner as in Example 25. The intrinsic viscosity, [η], of this polymer was 0.065 liter/g, molecular weight distribution, Mw/Mn, was 3.1 and HDT was 95° C. As to solvent resistance, all moldings, at mold temperatures of 30° C., 40° C. and 50° C., showed extremely slight formation of cracks.

EXAMPLE 27

A solution comprising 70 parts of MMA, 30 parts of toluene and 0.20 part of benzoyl peroxide was introduced into a 1.5-liter reactor equipped with a stirrer and a heating jacket, and heated to 80° C. under stirring. After the initiation of heating, 2-ethylhexyl thioglycolate was continuously added thereto, using a pump, for 2 hours at a rate of 0.5 cc/hr. After two hours, the system was cooled to room temperature to obtain a soft solid polymer with a degree of conversion to the polymer of 55%. The thus obtained polymer was heat- and vacuum-treated, crushed and pelletized in the same manner as in Example 25. The intrinsic viscosity, [η], of this polymer was 0.055 liter/g, molecular weight distribution, Mw/Mn, was 2.7, and HDT was 94° C. As to solvent resistance, all moldings, at metal mold temperatures of 30° C., 40° C. and 50° C., showed extremely slight formation of cracks.

What we claim is:

1. A process for producing an acrylic resin having an intrinsic viscosity of about 0.028 to about 0.117 l/g and a weight-average molecular weight to number-average molecular weight ratio, measured by gel permeation chromatography, of about 2.3 to about 6.0, which process comprises polymerizing at a temperature range of from 40° C. to 170° C., using a polymerization initiator:
   A. about 50 to 100 wt. % of methyl methacrylate, and
   B. 0 to about 50 wt. % of at least one monomer selected from the group consisting of acrylic ester monomer and methacrylic ester monomer, said acrylic ester monomer comprising the reaction product of an alkyl alcohol having 1 to 8 carbon atoms and acrylic acid and said methacrylic ester comprising the reaction product of an alkyl alcohol having 2 to 12 carbon atoms and methacrylic acid; and adding, after initiation of polymerization, about 0.01 to about 5 wt. %, based on the weight of monomer, of a chain transfer agent comprising at least one compound selected from the group consisting of alkylmercaptans containing 4 to 18 carbon atoms; esters of thioglycolic acid and an alkyl alcohol having 1 to 12 carbon atoms; said chain transfer agent being added at a stage where the degree of conversion to the polymer is about 10 to about 60%.

2. The process of claim 1 wherein up to 1 wt. %, based on the weight of monomer of chain transfer agent is present with the monomer at initiation of polymerization.

3. The process of claim 1 wherein said polymerization is suspension polymerization.

4. The process of claim 1 wherein said polymerization is bulk polymerization.

5. The process of claim 1 wherein said polymerization is solution polymerization.

6. The process of claim 1 wherein said chain transfer agent is added batchwise.

7. The process of claim 1 wherein said chain transfer agent is added continuously.

8. The process of claim 1 wherein said chain transfer agent is added intermittently.

9. An acrylic resin produced by the process of claim 1.

* * * * *